(12) United States Patent
Wasendorf, Sr.

(10) Patent No.: US 7,870,064 B2
(45) Date of Patent: Jan. 11, 2011

(54) METHOD AND APPARATUS FOR ON-LINE TRADING DISPLAY

(75) Inventor: Russell Ralph Wasendorf, Sr., Cedar Falls, IA (US)

(73) Assignee: Peregrine Financial Group, Inc., Chicago, IL (US)

( * ) Notice: Subject to any disclaimer, the term of this patent is extended or adjusted under 35 U.S.C. 154(b) by 0 days.

(21) Appl. No.: 12/848,425

(22) Filed: Aug. 2, 2010

(65) Prior Publication Data

US 2010/0299241 A1 Nov. 25, 2010

Related U.S. Application Data

(62) Division of application No. 11/441,527, filed on May 26, 2006, now Pat. No. 7,792,736.

(60) Provisional application No. 60/685,095, filed on May 26, 2005.

(51) Int. Cl.
*G06Q 40/00* (2006.01)

(52) U.S. Cl. .............................. 705/37; 705/35; 705/36; 345/838; 379/137; 386/83; 709/206

(58) Field of Classification Search ................... 705/35, 705/36, 37; 345/838; 379/137; 386/83; 709/206
See application file for complete search history.

(56) References Cited

U.S. PATENT DOCUMENTS

| | | | |
|---|---|---|---|
| 4,907,256 A * | 3/1990 | Higuchi et al. | 379/137 |
| 6,766,304 B2 | 7/2004 | Kemp, II et al. | |
| 6,772,132 B1 | 8/2004 | Kemp, II et al. | |
| 2001/0004418 A1 * | 6/2001 | Nagano et al. | 386/83 |
| 2002/0054158 A1 * | 5/2002 | Asami | 345/838 |
| 2002/0099644 A1 * | 7/2002 | Kemp et al. | 705/37 |
| 2002/0147670 A1 * | 10/2002 | Lange | 705/35 |
| 2003/0004852 A1 * | 1/2003 | Burns | 705/37 |
| 2003/0009411 A1 * | 1/2003 | Ram et al. | 705/37 |
| 2003/0177191 A1 * | 9/2003 | Kawashima et al. | 709/206 |
| 2005/0044031 A1 * | 2/2005 | Lebedev | 705/37 |
| 2005/0144109 A1 * | 6/2005 | Boni et al. | 705/36 |
| 2005/0234805 A1 * | 10/2005 | Robertson et al. | 705/37 |
| 2006/0010066 A1 * | 1/2006 | Rosenthal et al. | 705/37 |
| 2006/0069635 A1 * | 3/2006 | Ram et al. | 705/37 |

* cited by examiner

*Primary Examiner*—Ella Colbert
*Assistant Examiner*—Sanjeev Malhotra
(74) *Attorney, Agent, or Firm*—Schiff Hardin LLP

(57) ABSTRACT

The present method and software provides a display for a trader in tradable instruments that shows the market price and market depth. The display dynamically updates with data received from an electronic exchange and centers on the market price. Upon the trader moving a cursor over a trade entering portion of the screen to make a trade, the price is held stationary and no longer centers on the market price so as to permit the trader to select a price and quantity for trading. The displayed data is still being updated in the stationary screen, however. The trade is made by the trader selecting a price and quantity on the display. Movement of the cursor away from the trade selecting area results in the display again automatically centering on the market price in the dynamic display mode.

17 Claims, 6 Drawing Sheets

METHOD AND APPARATUS FOR ON-LINE TRADING DISPLAY

CROSS-REFERENCE TO RELATED APPLICATIONS

This application is a divisional application of U.S. patent application Ser. No. 11/441,527, filed May 26, 2006 now U.S. Pat. No. 7,792,736, incorporated herein by reference, which claims the benefit of U.S. Provisional Patent Application Ser. No. 60/685,095, filed May 26, 2005, which is also incorporated herein by reference.

BACKGROUND OF THE INVENTION

1. Field of the Invention

The present invention relates generally to method and apparatus for a display to be used in on-line trading, and more particularly to a method and software for displaying price and quantity data on a display screen for electronic trading in an electronic exchange.

2. Description of the Related Art

Markets in stocks, bonds, commodities and derivatives such as futures and options are increasingly becoming implemented electronically so that traders can view market conditions and make trades via computers connected to an electronic exchange rather than making trades by open outcry on a trading floor. The traders who participate in such electronic markets need access to market information in an easy to understand format. The traders also need a display that facilitates rapid and accurate trading, particularly in fast moving markets.

An example of a display for electronic trading is shown in U.S. Pat. No. 6,766,304, which is incorporated herein by reference.

SUMMARY OF THE INVENTION

The present invention provides a method for displaying market information and also provides software for displaying market information of an electronic exchange wherein the information is presented for viewing by a trader in an easy to understand and readily accessible way to permit the trader to view market changes. The display facilitates accurate trading and rapid access to the controls for making trading decisions and for making the trade.

In a preferred embodiment, a display is provided that shows market depth and market price. The display has two display modes. In one display mode, the display moves the prices on the screen in response to changes in market price on the exchange to maintain the current market trading price at a predetermined location on the screen so that the trader or other viewer of the display sees the changes in the market and easily monitors market direction and rate of change. This is referred to as a dynamic display mode. In another display mode, however, the display of the price information is held stationary and the price at which the market is currently trading moves on the screen in response to changes in market price on the exchange. In other words, the market price moves about on the screen but the prices are stationary. This is referred to as a stationary display mode. The trader can readily select a price for a trade in the stationary display mode with the assurance that the correct price is being selected and without the risk that a moving price display would result in a selection of an unintentional price. The change over from the dynamic display mode to the stationary display mode, and back again, is easily made by the user, in one example, by moving a mouse cursor to predetermined regions of the display and out of the predetermined regions.

DETAILED DESCRIPTION OF THE PREFERRED EMBODIMENTS

The present invention, in a preferred embodiment, is a software program that provides a display of market data of an electronic market. The display, in one embodiment, is part of an electronic trading package and provides traders, such as traders of futures or other tradable instruments, with the ability to focus on and select prices and quantities for trading. The program is loaded on a computer connected to an electronic exchange, preferably through a secure connection. Data from the electronic exchange is sent to the computer, including data relating to one or more tradable instruments, such as equities, bonds, futures, options, commodities, and the like. The preferred embodiment provides a display of trading information on a futures market for futures contracts. The data includes information on the name and/or type of the tradable instrument, prices and quantities for bids and asks (offers to buy and offers to sell) that are pending in the electronic market, and potentially other information relating to the market and/or the tradable instrument. The information from the electronic exchange is presented for the trader by the present display in an easy to understand format.

Further, the display also provides an interface for making the trades. A trader selects an item on the display representing a price and quantity of the tradable instrument and by that selection may transmit a trade to the electronic exchange. The selection by the trader to make the trade may be a single action such as a single click, a double action such as a double click, a combination of different actions such as left click then right click or right click then left click, a submenu activation, or other selection action. The preferred selection action requires a confirmation by the trader to prevent inadvertent trades. The selection may be through use of a computer mouse, trackball, pointing stick, touchpad, joystick, or other cursor moving device or selecting device. A touch screen display is also possible and may facilitate use for some users or in some applications.

Figure 1:
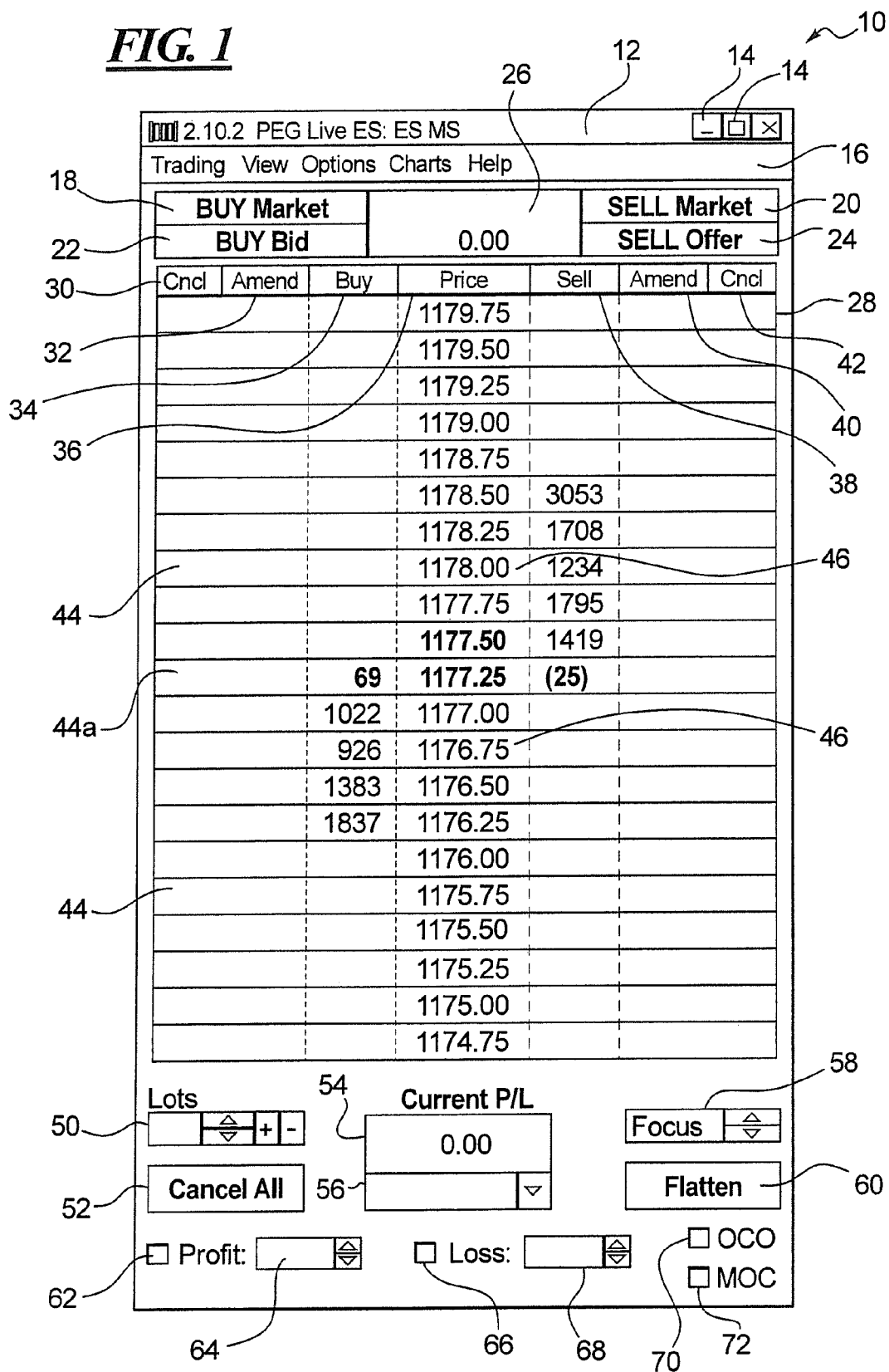
FIG. 1 is a screen shot of a display portion of an electronic market display according to the principles of the present invention.

Referring first to FIG. 1, a display screen is shown. The illustrated display screen is displayed on a display of a computer, such as a desktop computer, laptop computer, workstation computer, personal data assistant (PDA), notepad computer, virtual display, or other type of computer display device. The preferred embodiment of the display occupies a portion of the computer display, such as a window in a windows-based computer operating system, although the display can also occupy all of the display area. Other types of operating systems are of course possible.

In the FIG. 1 is shown the display 10 having standard window elements of a windows-based operating system including a title bar 12 with control buttons 14, a menu bar 16 with pull down menus having menus for trading, view, options, charts, and help. Selections under these menus would be familiar to most users of windows-based computers. In the window itself is an upper portion with a market order button 18 (marked BUY Market), a market sell button 20 (marked SELL Market), a buy bid button 22, a sell offer button 24 and a display window 26 for the current market position of the trader.

Below the buttons is a table display 28 having columns marked cncl (cancel) 30, amend 32, buy 34, price 36, sell 38, amend 40, and cncl (cancel) 42. As is apparent, the price column 36 is in the middle of the table 28 and columns relating to buying are on one side of the price column while the columns relating to selling are on the other side. The table display 28 includes rows 44 that relate to prices of the tradable instrument. The prices are generally provided as one row per price increment for the instrument. For example, in the instrument being shown in the illustration of FIG. 1, the price increment is 25 cents so each row of the table is accorded a price that is $0.25 different than the adjacent row above or below the row. Prices are displayed in descending order, although the user may also select a price display in ascending order.

The data shown in the display is for a futures contract. The table 28 has a top row with the price $1179.75, a bottom row with showing the price $1174.75, and a middle row 44a showing the price $1177.25. The dollar signs ($) are not shown in the display for the sake of simplicity. The numbers in the buy column 34 represent a bid to buy the indicated quantity of the tradable instrument at the price displayed in that row. For example, in the middle row 44a displays that there are currently 69 buy bids in the market for the tradable instrument at the price $1177.25. Below the middle row 44a is a row in which is displayed that there are 1022 bids to buy the instrument at the price $1177.00. The lowest priced bid to buy is an offer to buy 1837 units of the instrument at $1176.25. It is important to note that the quantities shown generally do not indicate an bid to buy from a single trader, but represent all current bids to buy the instrument in the electronic exchange, although it is possible that a single trader may be represented by the displayed quantity.

On the other side of the price column 36 is displayed information on the offers to sell the instrument that are current in the electronic exchange. The highest priced offer to sell is an offer of (or multiple offers totaling) 3053 units of the instrument at a price of $1178.50. At the price $1177.25 is indicated in parenthesis a number 25, indicating the quantity that traded at the last price of $1177.25. No current offers to sell are pending at this price.

The price at which the highest buy bid meets the lowest sell offer is referred to as "the market" or current market price. In the dynamic display mode, the current market price is maintained in the middle row of the display by shifting the prices up and/or down. The range of bids and offers that are currently pending on the exchange is referred to as the market depth. The tabular display of FIG. 1 clearly shows the market price and market depth. This information is presented in such a way that the trader can quickly get the information needed to make a trade.

The buttons above the table 28 permit fast trading at market conditions. For example, the buy market button 18 places a buy trade for the number of contracts shown in the Lots window 50 at the prevailing market price. The sell market button 20 places a trade on the exchange to sell all the units being bid to buy on the exchange at the market price. The buttons for buy bid 22 and sell offer 24 place trades in the exchange for the best bid and best offer, respectively.

In the table 28 itself, the selection of a price box 46 enables the trader to place a limit order at that price, for example, by a left click with a computer mouse while the cursor is placed over the Buy or Sell columns 34 or 38. An alternative selection of the Buy or Sell columns 34 or 38, such as a right click by the computer mouse, displays a popup menu to place stop orders, stop limit orders, and market-if-touched orders. Synthetic stop and stop limit orders are also possible. Synthetic stop and limit orders are stored on a user's computer, rather than on the exchange's servers, such as would be the case with a normal limit or stop order. Synthetic orders are cancelled when the user closes out of the trading application, whereas normal limit or stop orders can still be filled because they are stored on the exchange servers. Aside from where synthetic orders are held, they serve the same functions as regular stop or limit orders.

In the preferred display, the columns 34 and 38 are presented in different colors, with one color for the buy column and another color for the sell column. In addition, price data in the price boxes 46 is color coded to present one or more prices in a contrasting color for market position and fill prices, last trade, and bid and ask prices. The highlighting of these prices enables the trader to more readily determine his or her market position at a glance. The amend columns 32 and 40 enable the quantity of an order to be changed, orders to be combined with a drag and drop action, or price levels to be changed with a drag and drop action. This can be provided as a function of real or synthetic operation. In other words, the orders may actually be placed on the exchange or the trader can place synthetic orders that are stored locally on the trader's system. The cancel columns 30 and 42 enable the unfilled buy orders and sell orders to be cancelled by the trader by selection of the column adjacent the order to be cancelled, such as by clicking with the computer mouse.

Below the table 28 is a collection of tools to assist in placing orders. A selection box 50 for entering number of units, or lots, of the tradable instrument includes up and down arrows to increase or decrease the number of units, as well as plus and minus buttons. A cancel all button 52 immediately cancels all open orders and removes the trader from the market. A window 54 for displaying current profit or loss of the trader helps to keep track of how the trader is doing. Below the window 54 is a pull down 56 for selecting the account number. A customer can trade on more than one account, and can use the dropdown to select the account they would like to trade. A selection box 58 enables the user to focus on the current price and current bid and offer in the market. This button serves the same function as placing the cursor over the center price display column, or on any other areas of the screen where the price automatically focuses on the last price and last bid and offer. The arrows beside box 58 enable the user to scroll up and down from the last price and last bid and offer.

A flatten button 60 enables the user to both cancel all working orders and flatten all open positions. The tools section also includes a profit selection button 62 and a profit display box 64 with increase/decrease arrows as well as a loss selection button 66 with a loss display box 68 with increase/decrease arrows. These give the user the option of setting profit and loss parameters. For example, if the user wishes to set a stop loss order 3 points off of where an order is filled, they would select 3 points in button 68 and select button 66. Then when an order is filled, a stop loss order is automatically entered at a price level 3 points from where the order was filled. If the trader wants to set a profit objective 5 points off of where an order was filled, then they would enter 5 points in button 64, and select button 62. When an order is filled, a limit order will automatically be entered at a price level 5 points from where the order was filled. The arrows at the side of buttons 64 and 66 enable the user to adjust their profit and loss parameters up or down.

Further, OCO and MOC selection boxes 70 and 72 are provided. OCO orders stand for order cancel order, or one cancel other. When this button is selected, an automatic stop order or automatic limit order will automatically cancel the other. For example, if the user has entered a stop loss order of 3 points and a profit limit order of 5 points, then when one of these orders gets executed, the other order will automatically be cancelled. MOC stands for Market on Close orders. The user can select this to ensure that they don't carry any open positions or working orders at the day's close of trading.

The display 10 shown in FIG. 1 is referred to as the main price ticket. Data received from the electronic exchange results in the display being dynamic in that it automatically centers on the last price, the best bid, and best offer. This is referred to as a dynamic display mode, which enables the user to have the top of the market always front and center on the price ladder—the only exception being if the trader wishes to focus on an off the market order. The off market orders may be viewed by placing the cursor on the cancel, buy, amend, or sell columns 30, 32, 34, 38, 40 or 42. This will lock the screen at the location where the user's off the market order is showing, or at the price level where the cursor is placed in that column. With the present software and method, the main trade ticket display 10 will dynamically adjust so that the last price, best bid, and best offer is at the center of the screen whenever the user moves the cursor over the center price column 36, or anywhere off the price ladder portion of the trade ticket.

Figure 2:
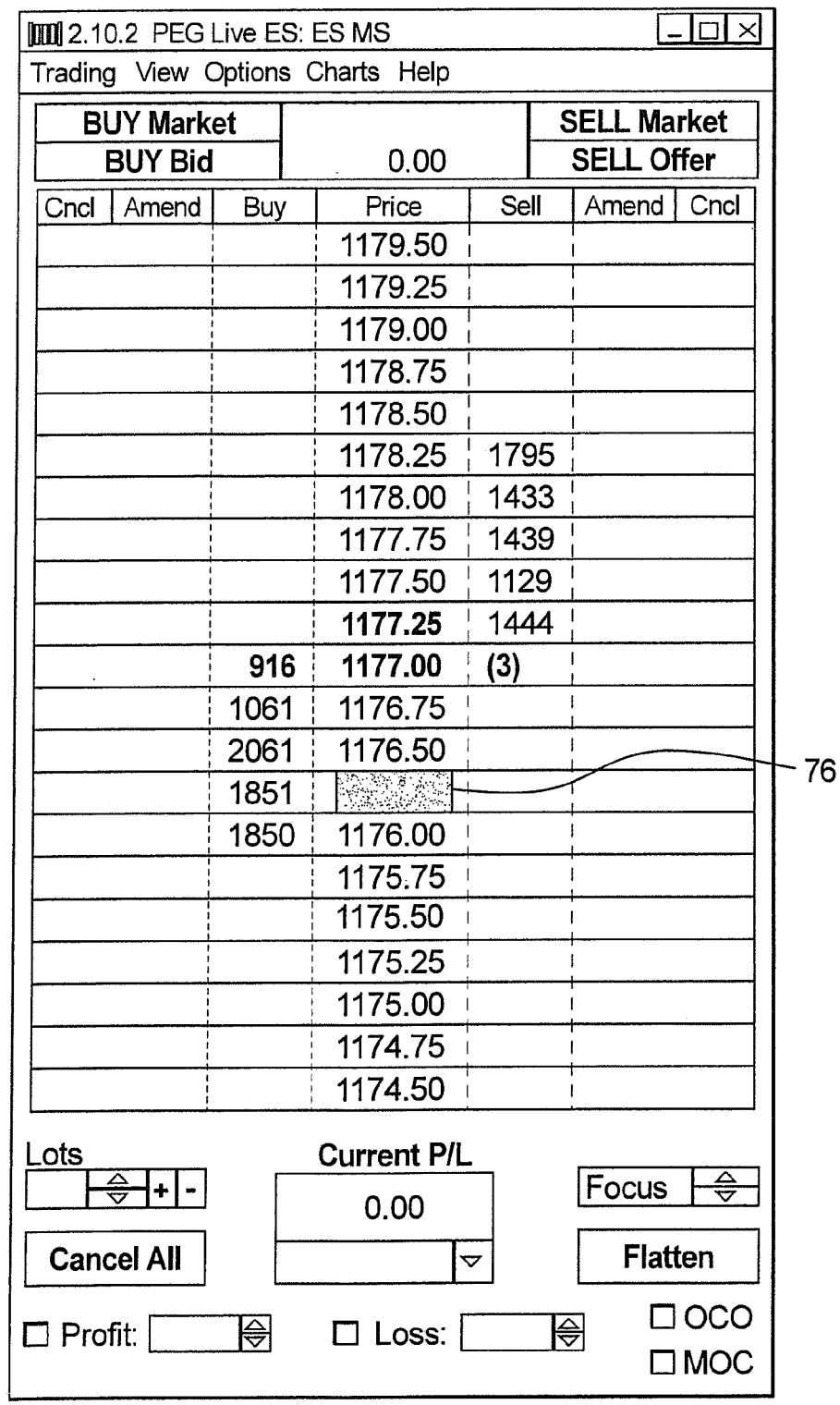
FIG. 2 is a screen shot of a display portion of the electronic market display that is updated and re-centered with a price change in the dynamic display mode.
Figure 3:
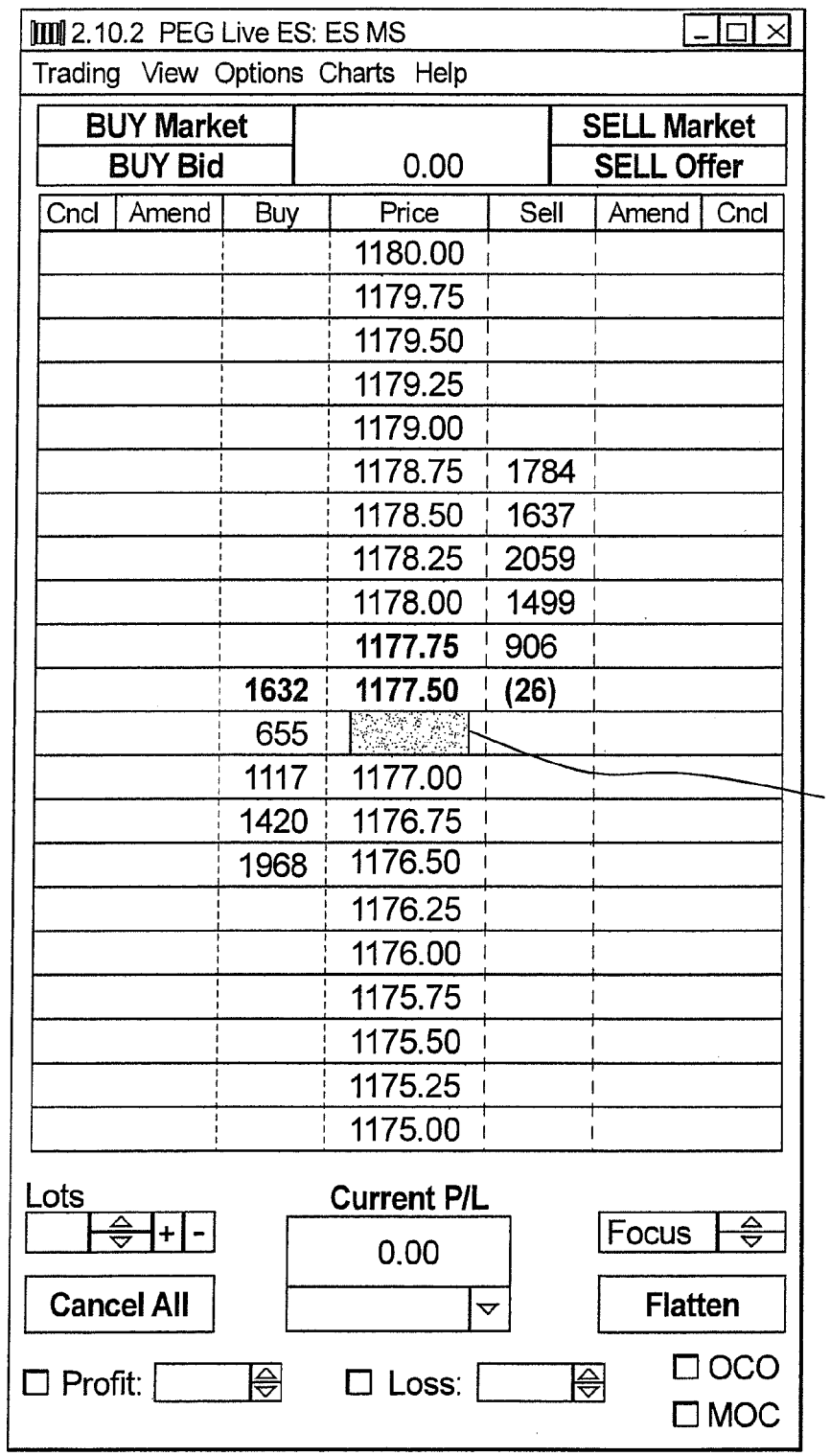
FIG. 3 is a screen shot of a display portion of the electronic market display that is updated and re-centered with a further price change in the dynamic display mode.

In FIG. 1, the main trade ticket display is showing a last price of 1177.25 at the center part of the trade ticket. Turning to FIG. 2, the main trade ticket has dynamically updated with data from the electronic exchange and shows a last price of 1177.00. The trade ticket has been dynamically adjusted so that the new price is at the center of the screen, without any action required by the trader. A shaded area 76 in the center price column shows where the cursor is located. In particular, the cursor is outside the areas for entering trades. With reference to FIG. 3, the main trade ticket is updated to show a last price of 1177.50 moments after the display of FIG. 2. The trade ticket is again dynamically adjusted so that the new price is at the center of the screen, without any action required by the trader. The shaded area 76 in the center price column shows where the cursor is located.

In a preferred embodiment, the market depth disappears when in the stationary display mode.

Figure 4:
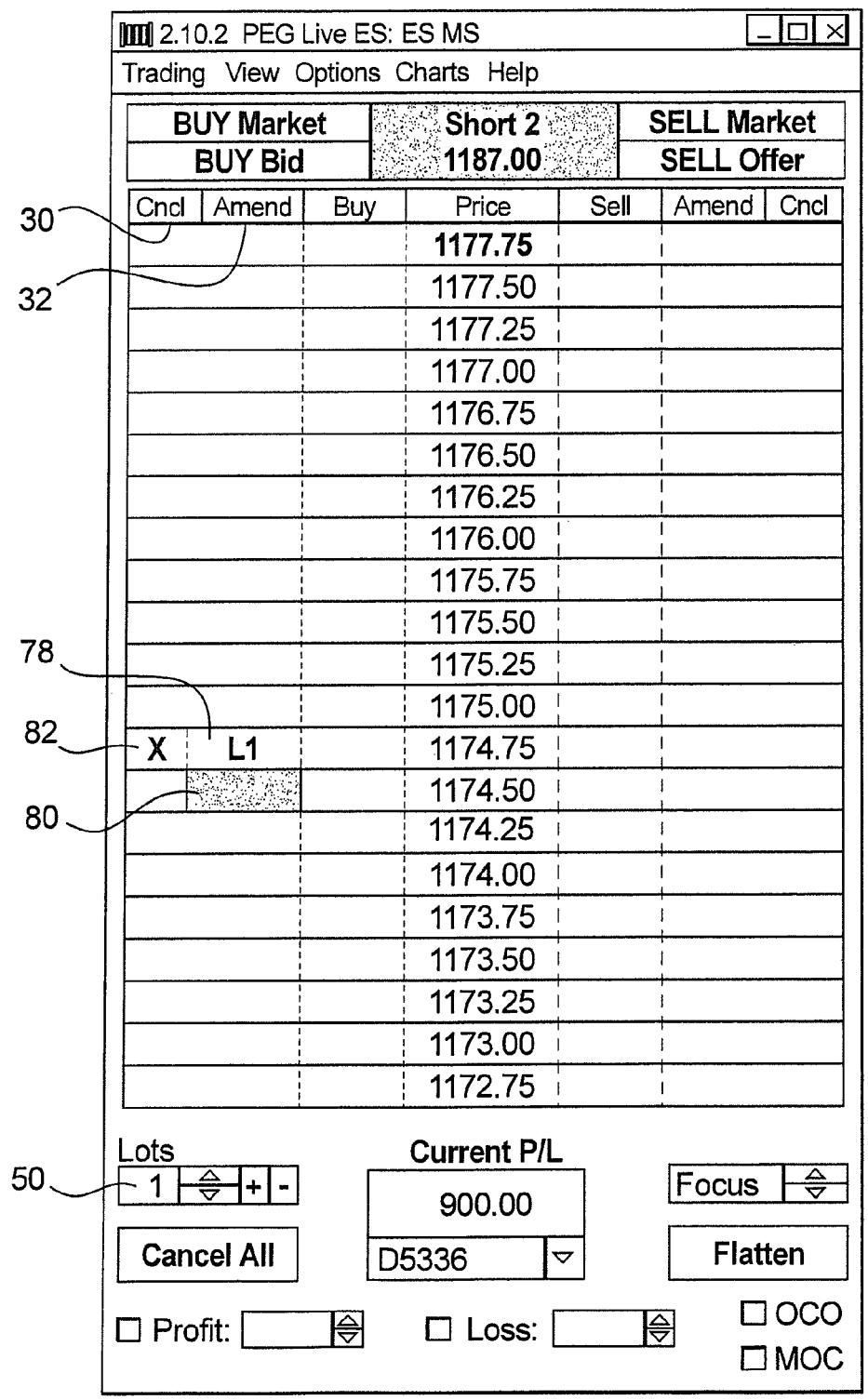
FIG. 4 is a screen shot of a display portion of the electronic market display in the stationary display mode which does not re-center with price changes due to a cursor being in a predetermined position and in which a trade has been entered by a user. Once in the stationary display mode, market depth disappears from the screen.

With reference now to FIG. 4, a limit buy order has been placed off of the market. The limit order is indicated in the amend column 32 by the designation L1 in the box 78, which corresponds to the price 1174.75. The last price (current market price) is not being centered because the trader has placed the cursor over one of the regions of the display at which trades may be entered. Here, the "amend" column 32 is an area that permits entry of trades and the cursor is in the amend column as indicated by the shaded box 80. The positioning of the cursor over a trade entering area holds the price display stationary, automatically switching the display to the stationary display mode and giving the trader the ability to focus on the working order in case the trader wants to amend the order. Compared to the display mode which dynamically re-centers the prices, the stationary display mode provides far less risk that an attempt to select a price for trading will result in the trade being made at a different price since the prices are stationary on the display. In other words, the prices do not move under the cursor while the trader is attempting to make the trade. The lots box 50 shows the single order that has been entered. Once in the stationary mode, market depth disappears from the screen. An X is shown in a box 82 in the cancel column 30.

The current market price is out of view in FIG. 4. This may be as a result of the trader scrolling the display to a desired price, such as through the use of scroll bars or arrow keys. It may also be as a result of the trader moving the cursor over a trade entering area of the display while the current market price is centered and then the current market price moves off screen as the result of rapid market movement. The trader's halting of the dynamic display mode and implementing of the stationary display mode by the cursor position is easy to perform by simple mouse movements.

Figure 5:
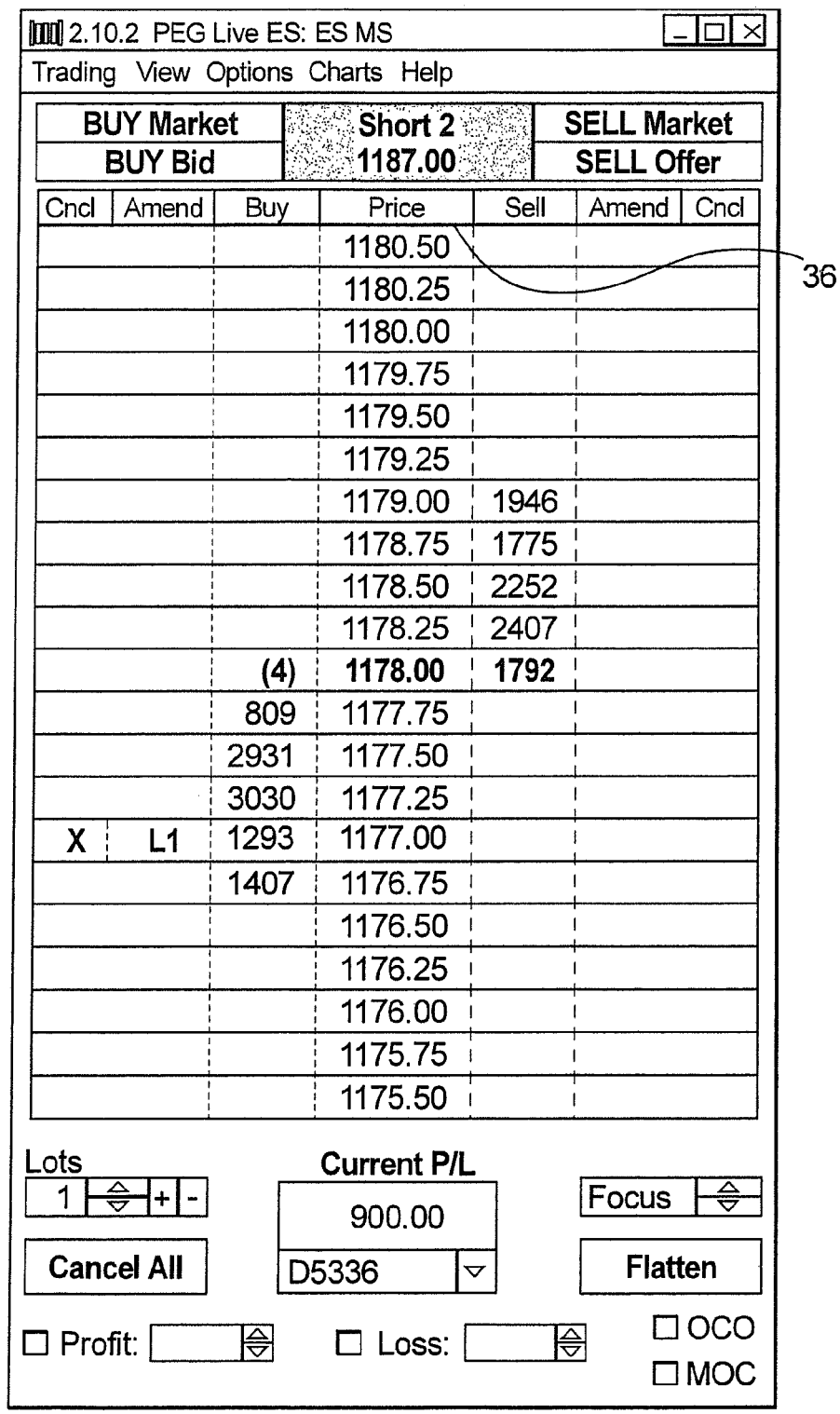
FIG. 5 is a screen shot of a display portion of the electronic market display after the trade has been entered and which has re-centered with a price change in the dynamic display mode.

In FIG. 5, when the trader moves the cursor off of the trade ticket 10 or over the price column 36 of the trade ticket or to some other non-trade entering area of the display, the trade ticket dynamically adjusts so that the last price (current market price) is once again centered on the price ladder portion of the screen. The price display is again dynamic so long as the cursor is in a non-trade entering area of the screen.

The trader can thereby easily switch between the dynamic and stationary modes by simple mouse movements. The mouse movement to the trade entering areas of the display are made when the trader wishes to make a trade and it is this motion that halts the dynamic movement to make the trade entry easier. After entry of the trade, the mouse movement to other areas of the screen enables the trader to monitor the market movement and make further decisions about trades.

The present software and method has a dynamic price ladder 36 that automatically centers on the last price 44a and the best bid and best ask There is no need for the user to move a scroll bar manually or click somewhere on their screen to move the most recent price to the center of their screen as the price moves.

Figure 6:
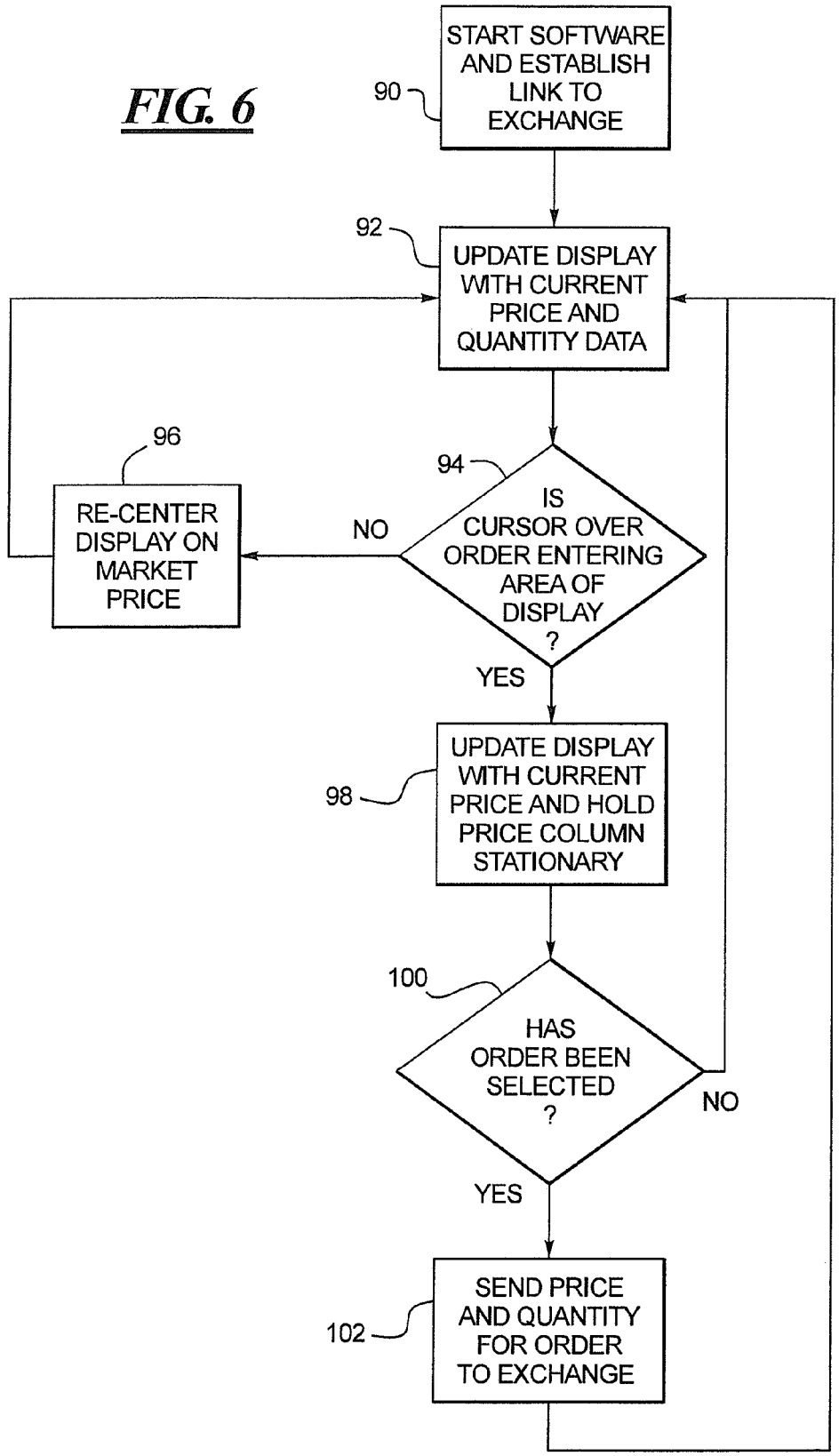
FIG. 6 is a process flow chart showing the steps performed according to the present method.

Turning now to FIG. 6, the process steps of the present method are shown, beginning in this embodiment with the starting of the software on a computer and establishing a link to the electronic exchange as shown at block 90. The display is updated with the current prices and quantities at block 92. At 94, a check is made as to whether the cursor is over the order entering areas of the display. If not, the display is re-centered on the market price at 96. The update of the display 92 is performed again.

If the cursor is over an order entering area of the display as determined at 94, the display is updated with data from the exchange but the price column is held stationary, as indicated at 98. A determination is made as to whether the user has made a selection as an order entry at 100. If so, the order is sent to the exchange at 102. Thereafter, the display is updated at 92. If no order has been entered, then the display is updated at 92.

The foregoing method steps illustrate re-centering or non-recentering of the display in the dynamic display mode and stationary display mode and for the sake of simplicity do not show additional functions performed by the software, although such additional functions are included in a preferred embodiment.

The software of an exemplary embodiment is currently written in C++ programming language, although other languages are of course possible.

The present software and method brings advanced electronic trading capabilities to the trader. Multiple functionality and analytical tools are provided to the display screen in an easy to use manner and at-a-glance display. Order entry is efficient in either real or simulated trading. The present software may be customized by the user, as desired.

Although other modifications and changes may be suggested by those skilled in the art, it is the intention of the inventors to embody within the patent warranted hereon all changes and modifications as reasonably and properly come within the scope of their contribution to the art.

I claim:

1. A method for display of, on a device, market price for tradable interests on a market and for submitting offers for the tradable interest to the market, comprising the steps of:
   receiving data from the market for the tradable interest, the data including price data for offers to buy and offers to sell the tradable interest submitted to the market;
   displaying the price data in an ordered display, said ordered display indicating offers to buy in a first display area and indicating offers to sell in a second display area and displaying market price in a market price area intermediate between said first and second display areas, said ordered display having two display modes;
   a first display mode of said ordered display maintaining the market price at a predetermined fixed location on the display and changing price data in said first and second display areas and said market price area as market data is updated from the market, wherein the first display mode is a dynamic display mode;
   a second display mode of said ordered display maintaining the price data in stationary locations on the display and changing locations of said market price area as the market data is updated from the market; and
   switching between said first mode and said second mode, on the device, as a cursor is pointed over predetermined locations on the display by a user.

2. A method as claimed in claim 1, further comprising:
   accepting an offer to trade while in said second mode of the display and forwarding the offer to trade to the market, said offer to trade being at least one of an offer to buy and an offer to sell.

3. A method as claimed in claim 2, wherein said offer to trade is accepted by receiving a user selection of price or quantity while the cursor is over a corresponding display of price or quantity of the tradable interest.

4. A method for display of, on a device, market data for a tradable interest, comprising the steps of:
   providing an ordered display of, on the device, the market data including price data from an electronic exchange, the ordered display being ordered by price, the ordered display showing offers to buy in a first area of the display and showing offers to sell in a second area of the display and showing current market price in a third area of the display;
   in a first display mode, maintaining said first and second and third areas of the display in stationary locations on the display as updated market data is received from the electronic exchange, the price data displayed in said first and second and third area changing as the market data is updated, wherein the first display mode is a dynamic display mode;
   in a second display mode, maintaining the price data in stationary locations on the display as the updated market data is received from the electronic exchange, the first and second and third areas moving on the display as the market data is updated including potentially moving off the display;
   switching between said first display mode and said second display mode, on the device, depending on a user action.

5. A method as claimed in claim 4, wherein said user action is movement of a cursor between predetermined areas of the display.

6. A method as claimed in claim 4, further comprising:
   receiving user instructions to submit an offer to the market, the user instructions including selection of an area on the display;
   forwarding the offer to the market, the offer being at least one of an offer to buy and an offer to sell the tradable interest.

7. A method as claimed in claim 6, wherein said step of receiving the user instructions includes accepting a cursor selection of an area of the display showing a price of the tradable interest or an area of the display showing a quantity of the tradable interest.

8. A method as claimed in claim 4, wherein said ordered display is a table showing price data in a column of the table and quantity information on columns of the table, said quantity information for offers to buy being displayed in a different column than quantity information for offers to sell.

9. A method as claimed in claim 4, wherein said ordered display is a table having columns showing quantity of offer to buy and quantity of offer to sell and price.

10. A method as claimed in claim 4, wherein said tradable interest is one of futures and options and commodities and equities and bonds.

11. A computer on which is stored software that is operable on the computer to perform the steps of:
    providing an ordered display of, on a device, market data including price data from an electronic exchange, the ordered display being ordered by price, the ordered display showing offers to buy in a first area of the display and showing offers to sell in a second area of the display and showing current market price in a third area of the display;
    in a first display mode, maintaining said first and second and third areas of the display in stationary locations on the display as updated market data is received from the electronic exchange, the price data displayed in said first and second and third area changing as the market data is updated, wherein the first display mode is a dynamic display mode;
    in a second display mode, maintaining the price data in stationary locations on the display as the updated market data is received from the electronic exchange, the first and second and third areas moving on the display as the market data is updated including potentially moving market price out of the display area;
    switching between said first display mode and said second display mode, on the device, depending on a user action.

12. Tangible computer readable media as claimed in claim 11, wherein said user action is movement of a cursor between areas of the display.

13. Tangible computer readable media as claimed in claim 11, further comprising:

receiving user instructions to submit an offer to the market, the user instructions including selection of an area on the display;

forwarding the offer to the market, the offer being at least one of an offer to buy and an offer to sell the tradable interest.

14. Tangible computer readable media as claimed in claim 13, wherein said step of receiving the user instructions includes accepting a cursor selection of one of an area of the display showing a price and an area of the display showing a quantity of the tradable interest.

15. Tangible computer readable media as claimed in claim 11, wherein said ordered display is a table showing price data in a column of the table.

16. Tangible computer readable media as claimed in claim 11, wherein said ordered display is a table having columns showing quantity of offer to buy and quantity of offer to sell and price.

17. Tangible computer readable media as claimed in claim 11, wherein said tradable interest is one of futures and options and commodities and equities and bonds.

* * * * *